US011195167B2

(12) United States Patent
Sun

(10) Patent No.: US 11,195,167 B2
(45) Date of Patent: Dec. 7, 2021

(54) OFFLINE PAYMENT METHOD AND DEVICE

(71) Applicant: Advanced New Technologies Co., Ltd., Grand Cayman (KY)

(72) Inventor: Yuanbo Sun, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/724,711

(22) Filed: Dec. 23, 2019

(65) Prior Publication Data

US 2020/0126062 A1 Apr. 23, 2020

Related U.S. Application Data

(63) Continuation of application No. 16/225,160, filed on Dec. 19, 2018, which is a continuation of application No. PCT/CN2017/087407, filed on Jun. 7, 2017.

(30) Foreign Application Priority Data

Jun. 20, 2016 (CN) .......................... 201610448201.7

(51) Int. Cl.
*G06Q 20/32* (2012.01)
*G06Q 20/40* (2012.01)
(Continued)

(52) U.S. Cl.
CPC ..... *G06Q 20/3274* (2013.01); *G06Q 20/0658* (2013.01); *G06Q 20/0855* (2013.01);
(Continued)

(58) Field of Classification Search
CPC ........................................... G06Q 20/00–425
See application file for complete search history.

(56) References Cited

U.S. PATENT DOCUMENTS 5,892,900 A 4/1999 Gintern et al.
6,304,974 B1 * 10/2001 Samar ................ H04L 63/0442
380/279
(Continued)

FOREIGN PATENT DOCUMENTS

CN 102831734 12/2012
CN 102903045 1/2013
(Continued)

OTHER PUBLICATIONS

Ron White, How Computers Work, 7th edition (Year: 2003).*
(Continued)

*Primary Examiner* — John W Hayes
*Assistant Examiner* — Taylor S Rak
(74) *Attorney, Agent, or Firm* — Fish & Richardson P.C.

(57) ABSTRACT

The present application provides techniques for offline payments. The method includes: receiving an offline payment request for an offline payment through a target payment application, the offline payment being made by a user registered with the target payment application; receiving an identity authentication identifier (ID) of the user; determining that the identity authentication ID of the user matches a stored identity authentication ID previously stored for the user on the computing device; in response to determining that the identity authentication ID matches the stored identity authentication ID, receiving an offline payment certificate issued by the target payment application to the user and stored on the computing device; and providing the offline payment certificate to an offline payment service party of the target payment application, the offline payment service party configured to authorize the offline payment based on the offline payment certificate.

20 Claims, 10 Drawing Sheets

(51) Int. Cl.
*G06Q 20/08* (2012.01)
*G06Q 20/06* (2012.01)
*G06Q 20/38* (2012.01)

(52) U.S. Cl.
CPC ..... *G06Q 20/3227* (2013.01); *G06Q 20/3829* (2013.01); *G06Q 20/38215* (2013.01); *G06Q 20/40* (2013.01); *G06Q 20/4014* (2013.01); *G06Q 20/40145* (2013.01)

(56) References Cited

U.S. PATENT DOCUMENTS

| | | | |
|---|---|---|---|
| 9,147,187 B1* | 9/2015 | Gailloux | G06Q 20/3278 |
| 9,509,686 B2* | 11/2016 | Anantha | G06Q 20/34 |
| 2006/0229988 A1 | 10/2006 | Oshima et al. | |
| 2007/0135164 A1 | 6/2007 | Lee | |
| 2013/0109307 A1* | 5/2013 | Reisgies | H04W 4/08 455/41.1 |
| 2013/0185214 A1 | 7/2013 | Azen et al. | |
| 2013/0246261 A1* | 9/2013 | Purves | G06Q 20/105 705/41 |
| 2013/0282588 A1* | 10/2013 | Hruska | G06Q 20/10 705/67 |
| 2014/0040149 A1 | 2/2014 | Fiske | |
| 2015/0026049 A1* | 1/2015 | Theurer | G06Q 20/405 705/41 |
| 2015/0046337 A1 | 2/2015 | Hu et al. | |
| 2015/0220917 A1* | 8/2015 | Aabye | G06Q 20/3278 705/64 |
| 2015/0278795 A1 | 10/2015 | Jiang et al. | |
| 2015/0332262 A1* | 11/2015 | Lingappa | G06Q 20/3823 705/71 |
| 2015/0339664 A1 | 11/2015 | Wong et al. | |
| 2015/0348008 A1 | 12/2015 | Khan | |
| 2016/0048828 A1 | 2/2016 | Lee | |
| 2019/0122202 A1 | 4/2019 | Sun | |

FOREIGN PATENT DOCUMENTS

| | | |
|---|---|---|
| CN | 104301293 | 10/2015 |
| CN | 105493116 | 4/2016 |
| JP | H10134126 | 5/1998 |
| JP | 2002163483 | 6/2002 |
| JP | 2004021311 | 1/2004 |
| JP | 2004533050 | 10/2004 |
| JP | 2006509298 | 3/2006 |
| JP | 2008217654 | 9/2008 |
| KR | 20120019964 | 3/2012 |
| KR | 20160042865 | 4/2016 |
| RU | 2427915 | 8/2011 |
| RU | 2536357 | 12/2014 |
| RU | 2580086 | 4/2016 |
| TW | I522836 | 2/2016 |
| WO | WO 2004066177 | 8/2004 |
| WO | WO 2012091349 | 7/2012 |
| WO | WO 2014201149 | 12/2014 |
| WO | WO 2015039568 | 3/2015 |
| WO | WO 2015177574 | 11/2015 |

OTHER PUBLICATIONS

Crosby et al., "BlockChain Technology: Beyond Bitcoin," Sutardja Center for Entrepreneurship & Technology Technical Report, Oct. 16, 2015, 35 pages.
European Extended Search Report in European Patent Application No. 17814598.3, dated May 23, 2019, 8 pages.
International Preliminary Report on Patentability in International Application No. PCT/CN2017/087407, dated Dec. 25, 2018, 11 pages (with English Translation).
International Search Report by the International Searching Authority issued in International Application No. PCT/CN2017/087407 dated Sep. 4, 2017; 9 pages.
Nakamoto, "Bitcoin: A Peer-to-Peer Electronic Cash System," www.bitcoin.org, 2005, 9 pages.
Written Opinion in International Application No. PCT/CN2017/087407, dated Sep. 7, 2017, 7 pages (with English Translation).
U.S. Appl. No. 16/225,160, filed Dec. 19, 2018.

* cited by examiner

OFFLINE PAYMENT METHOD AND DEVICE

CROSS-REFERENCE TO RELATED APPLICATIONS

This application is a continuation of U.S. application Ser. No. 16/225,160, filed on Dec. 19, 2018, which is a continuation of PCT Application No. PCT/CN2017/087407, filed on Jun. 7, 2017, which claims priority to Chinese Patent Application No. 201610448201.7, filed on Jun. 20, 2016, and each application is hereby incorporated by reference in its entirety.

TECHNICAL FIELD

The present application relates to network technologies, and in particular, to an offline payment method and device.

BACKGROUND

Offline payment is a method that payment can be made without a network. This method is gradually applied because this method can make user's payment more convenient without consuming network resources. When smart devices such as smartphones or smart watches are used as consumer terminal devices, the consumer terminal devices also need to be able to make offline payment to facilitate user's payment. In addition, with the development of the mobile Internet, integrating a third-party payment company's payment method into a consumer terminal device gradually becomes a trend. A user can quickly open a third-party payment application that corresponds to the third-party payment company in the consumer terminal device, and use the third-party payment application to make payment quickly. In this case, a need may arise accordingly, that is, the user can select an account of a payment application from the opened third-party payment application to make offline payment. As such, user's payment can be more convenient.

However, in related technologies, even if an account of another payment application is selected from the third-party payment application for offline payment, a payment client of the payment application on the consumer terminal device needs to be invoked, and the payment client performs an offline payment procedure of the payment transaction. In this method, procedure processing is relatively cumbersome for the user, and an offline payment identity certificate generated by the another payment application can be directly obtained after receiving by the consumer terminal device. In other words, the user can easily obtain an offline payment identity certificate of a payment application from the third-party payment application. Consequently, the security is relatively low.

SUMMARY

The present application provides an offline payment method and device, so that user's payment can be quicker and more secure when a payment application is selected from a third-party payment application integrated into a consumer terminal device to make offline payment.

The present application is implemented by using the following technical solutions:

According to a first aspect, an offline payment method is provided, where the method is used to make offline payment by using a target payment application in a third-party payment application integrated into a terminal device, and the method includes: obtaining, by the third-party payment application, an identity authentication identifier of a user that sends an offline payment request, when the third-party payment application receives the offline payment request that corresponds to the target payment application, where the user is a registered user of the target payment application; obtaining, by the third-party payment application, an offline payment certificate issued by the target payment application to the user and stored in the terminal device, when it is determined that the obtained identity authentication identifier is verified based on an identity authentication identifier stored at the time the user enables offline payment of the target payment application; and providing, by the third-party payment application, the offline payment certificate for an offline payment service party, so that the offline payment service party requests the target payment application to process the offline payment of the user based on the offline payment certificate.

According to a second aspect, an offline payment method is provided, where the method is used to make offline payment by using a target payment application in a third-party payment application integrated into a terminal device, and the method includes: receiving, by an offline payment server of the target payment application, an offline payment activation request sent by a third-party payment application, where the offline payment activation request includes a user ID of a user and a terminal device ID of the terminal device, and the user is a registered user of the target payment application; and generating, by the offline payment server, an offline payment certificate that corresponds to the user ID, and sending the offline payment certificate to the third-party payment application after encrypting the offline payment certificate by using a terminal device public key that corresponds to the terminal device ID, so that the third-party payment application obtains the offline payment certificate after performing decryption by using a terminal device private key that corresponds to the terminal device ID.

According to a third aspect, an offline payment device is provided, where the device is applied to a third-party payment application, and is configured to make offline payment by using a target payment application in the third-party payment application integrated into a terminal device, and the device includes: an information acquisition module, configured to obtain an identity authentication identifier of a user that sends an offline payment request when the third-party payment application receives the offline payment request that corresponds to the target payment application, where the user is a registered user of the target payment application; a certificate acquisition module, configured to obtain an offline payment certificate issued by the target payment application to the user and stored in the terminal device, when it is determined that the obtained identity authentication identifier is verified based on an identity authentication identifier stored at the time the user enables offline payment of the target payment application; and a certificate providing module, configured to provide the offline payment certificate for an offline payment service party, so that the offline payment service party requests the target payment application to process the offline payment of the user based on the offline payment certificate.

According to a fourth aspect, an offline payment device is provided, where the device is applied to an offline payment server of a target payment application, and is configured to make offline payment by using a target payment application in a third-party payment application integrated into a terminal device, and the device includes: a request receiving module, configured to receive an offline payment activation request sent by the third-party payment application, where the offline payment activation request includes a user ID of a user and a terminal device ID of the terminal device, and the user is a registered user of the target payment application; and a certificate providing module, configured to generate an offline payment certificate that corresponds to the user ID, and send the offline payment certificate to the third-party payment application after encrypting the offline payment certificate by using a terminal device public key that corresponds to the terminal device ID, so that the third-party payment application obtains the offline payment certificate after performing decryption by using a terminal device private key that corresponds to the terminal device ID.

According to the offline payment method and device provided in the present application, the third-party payment application stores the certificate in the terminal device locally, and can obtain the certificate from the terminal device locally when the certificate is to be used. As such, user's payment can be more convenient when the payment application is selected from the third-party payment application integrated into the consumer terminal device to make offline payment. In addition, when the stored certificate is obtained locally from the terminal device, the identity authentication identifier of the user needs to be first verified, so that the use of the certificate can be more secure.

DESCRIPTION OF IMPLEMENTATIONS

Figure 1:
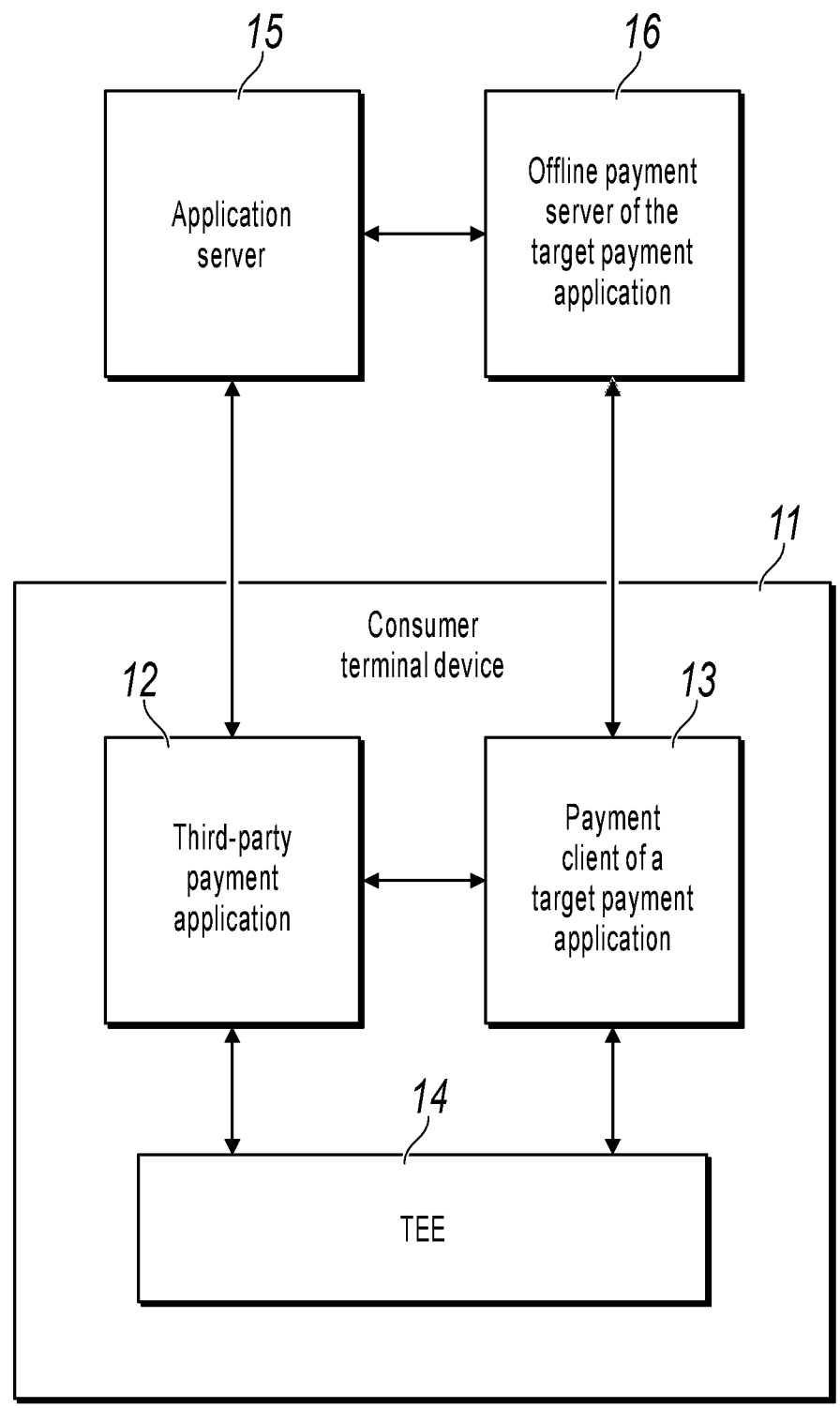
FIG. 1 is a diagram illustrating an application environment of an offline payment method, according to an example implementation of the present application.

Example implementations are described in detail here, and examples of the implementations are presented in the accompanying drawings. When the following description relates to the accompanying drawings, the same numbers in different accompanying drawings represent the same or similar elements unless specified otherwise. Implementations described in the following example implementations do not represent all implementations consistent with the present application. On the contrary, they are only examples of devices and methods that are described in the appended claims in detail and that are consistent with some aspects of the present application.

With the development of the mobile Internet, the integration of a payment method of a third-party payment company into a consumer terminal device gradually becomes a trend. A user can quickly open a third-party payment application that corresponds to the third-party payment company in the consumer terminal device, and use the third-party payment application to make payment quickly. For example, the third-party payment application can be applications such as Android Pay, Samsung Pay, and Huawei Pay. The third-party payment applications can be quickly started and opened in a consumer terminal device (for example, a smart device such as a smartphone). When using the third-party payment application, the user may have the following needs: For example, the user already has an account of a payment application (for example, the application is ALIPAY). The user expects to use the previously mentioned payment application in the third-party payment application to make offline payment after the third-party payment application is opened quickly. For example, the user expects to use offline payment of ALIPAY in Huawei Pay.

If the payment application is invoked by the third-party payment application, and the payment application performs processing based on an existing offline payment method, efficiency is relatively low, and the procedure is tedious. For example, ALIPAY client software is invoked in Huawei Pay, and the ALIPAY client software interacts with an offline payment server on an ALIPAY backend to make offline payment of ALIPAY. In this method, the third-party payment application is not involved. In addition, an offline code (which can be referred to as an offline payment certificate) generated by the ALIPAY client software can be directly obtained (for example, can be obtained by a merchant serving as an offline payment service party by directly scanning the code). Consequently, the security is relatively low. Based on this, an implementation of the present application provides an offline payment method. An objective of the method is as follows: When a payment application needs to be selected from a third-party payment application integrated into a consumer terminal device to make offline payment, a method that the third-party payment application applies to the payment application for acquisition of an offline payment certificate is provided, and the third-party payment application stores the certificate in the terminal device locally. As such, the third-party payment application can quickly obtain the certificate in subsequent certificate use. The method provides a procedure for interaction between the third-party payment application and the payment application, so that the payment application can provide an offline code for the third-party payment application. In addition, the procedure is convenient and more secure, and are described in detail below.

The following describes an offline payment method in the present application. A payment application that interacts with a third-party payment application can be referred to as a target payment application (such as ALIPAY, but is not limited to ALIPAY, can be another application), and the third-party payment application is not limited to applications such as Samsung Pay and Huawei Pay mentioned above. In addition, in the description of the method, an offline code is referred to as an "offline payment certificate", and a form of the offline code is not limited. For example, the offline code can be a two-dimensional code.

FIG. 1 illustrates devices or modules that participate in an offline payment method and can be involved in an application of the method in an implementation of the present application. For example, a consumer terminal device 11 can include a third-party payment application 12 (such as Huawei Pay), a payment client 13 (ALIPAY client software) of a target payment application, and a trusted execution environment (TEE) 14. The TEE can provide a secure execution environment, and an application that has a relatively high security requirement can run in the environment. For example, the payment client 13 can run in the TEE 14, and the TEE 14 can provide services such as authorization, authentication, and storage for the application.

An application server 15 and an offline payment server 16 of the target application can be further included in FIG. 1. The application server 15 can be a backend server of the third-party payment application 12. The offline payment server 16 can be a backend server that is of the target payment application and is responsible for an offline payment service. For example, an offline payment server of ALIPAY can provide offline payment service activation for a registered ALIPAY user. In addition, in FIG. 1, arrows are also used to indicate that these devices or modules can interact with each other. For example, the application server 15 and the offline payment server 16 can interact with each other (for example, send a request and a response), the third-party payment application 12 and the payment client 13 can interact with each other, etc.

With reference to FIG. 1, the following describes how to perform an offline payment interaction procedure between the target payment application and the third-party payment application. The procedure is an example of interaction between the devices or modules in FIG. 1. Offline payment activation, use, and deactivation between the third-party payment application and the target payment application are separately described in the method.

Offline Payment Activation:

Assume that a registered user of a target payment application wants to enable offline payment, and wants to enable an offline payment feature by using the target payment application in the third-party payment application. In this case, the user can open the third-party payment application, and choose to enable the offline payment of the target payment application in the third-party payment application. A selection method can be flexibly set. For example, a plurality of payment applications can be displayed in an interface of the opened third-party payment application for selection and use of the user. The user can select the target payment application from the applications, and choose to enable the offline payment of the target payment application.

Figure 2A:
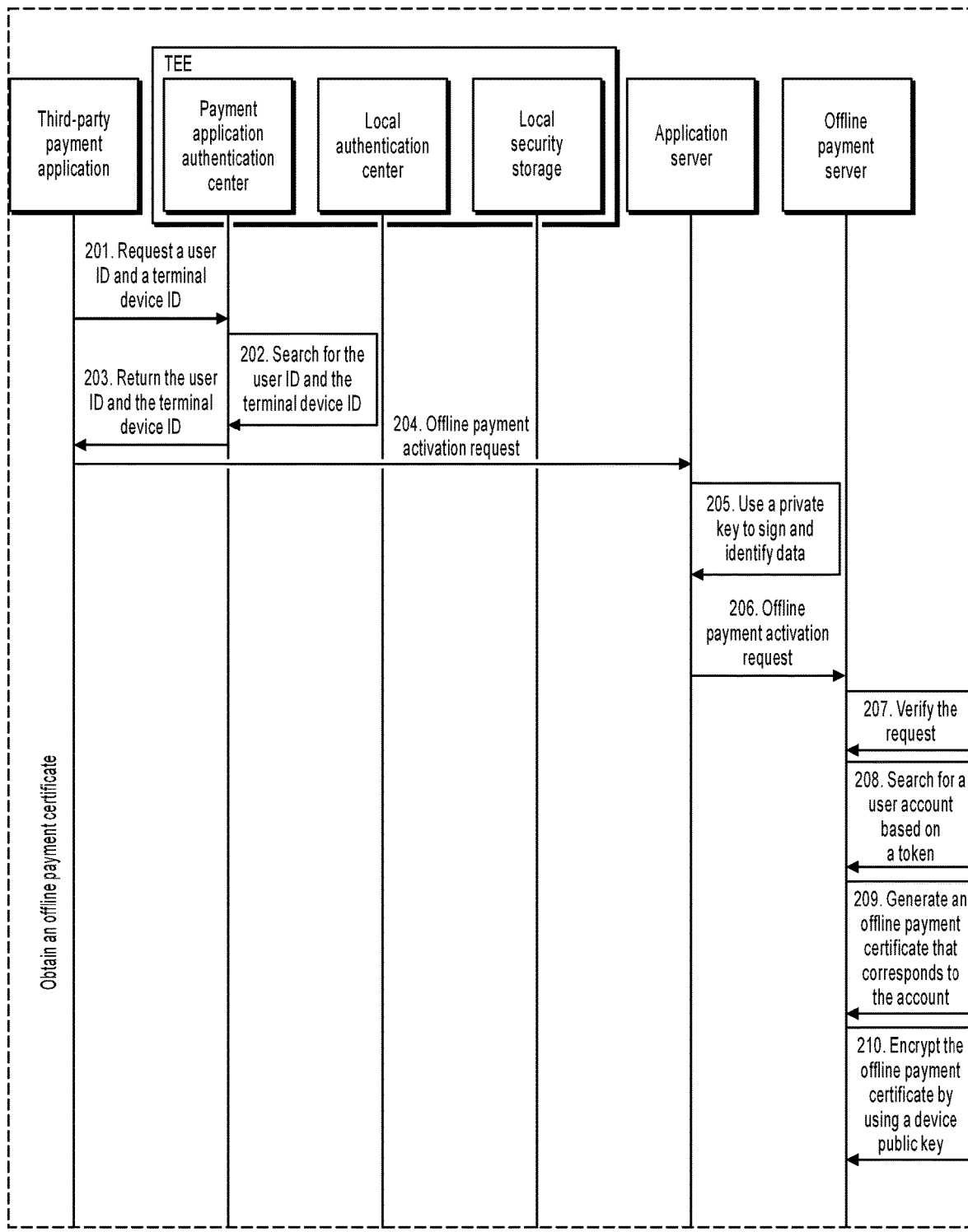
FIGS. 2A-2B illustrate an offline payment activation procedure, according to an example implementation of the present application.
Figure 2B:
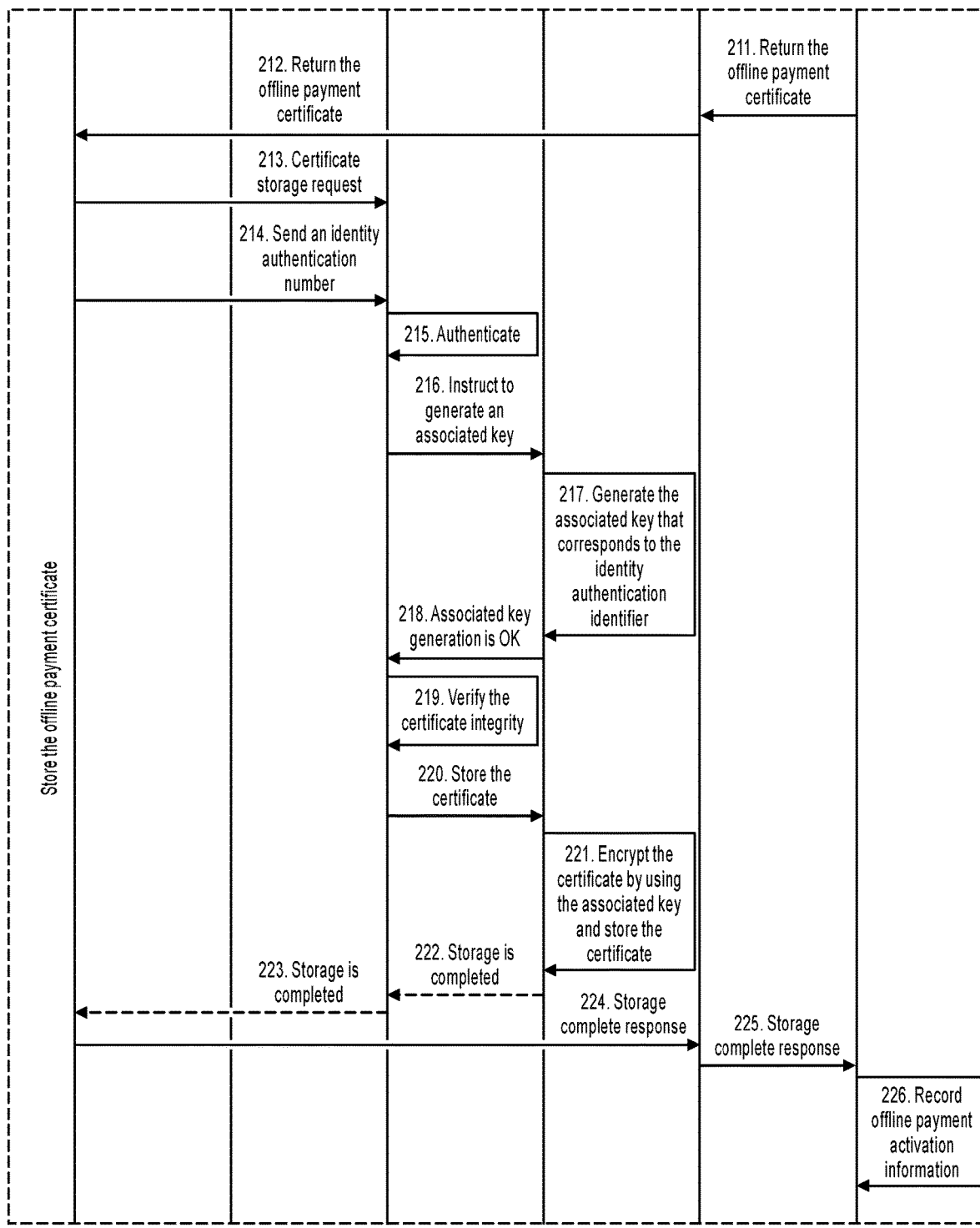

After receiving the user selection, the third-party payment application learns that the user wants to enable the offline payment that corresponds to the target payment application. In this case, execution of an offline payment activation procedure shown in FIGS. 2A-2B can be started. It is worthwhile to note that the procedure shown in FIGS. 2A-2B is merely an example procedure. In specific implementations, another procedure can also be used. For example, a sequence between steps is changed. Referring to FIGS. 2A-2B, the procedure can include the following processing. A TEE can include a payment application authentication center, a local authentication center, and local security storage. The payment application authentication center can be a payment client of the target payment application. In addition, the local authentication center and the local security storage can be referred to as a local storage device because the local authentication center and the local security storage in the TEE are used when the third-party payment application stores an offline payment certificate in subsequent steps. An application server and an offline payment server of the target payment application also participate in the procedure.

In step 201 to step 203, the third-party payment application can obtain a user ID and a terminal device ID from the payment client of the target payment application. For example, when learning, based on user selection, that the user wants to enable offline payment of a target payment application, the third-party payment application can send a request to a payment client that is of the target payment application and is located in the same terminal device, to obtain the user ID and the terminal device ID. The user ID is an ID of a user who currently logs in to an account of the target payment application. For example, both a third-party payment application xx Pay and a payment application client software APP are installed on a mobile phone of a user. In this case, the user who currently logs in to the target payment application is a user who logs in to the payment application client software on the mobile phone, and the payment application client software feeds back a user ID of the user and a terminal device ID to the third-party payment application.

In the present implementation, the user ID returned by the payment client to the third-party payment application can be a token (token) that corresponds to a user account (also referred to as a user ID) of the payment application that the user currently logs in to, the token can be a token that corresponds to the user ID and is generated by the offline payment server of the target payment application for the user after registration of the user; and the server sends the token to the payment client. The terminal device ID can be a unique ID of the terminal device.

In addition, the payment client not only returns the terminal device ID and the user ID to the third-party payment application, but can also send a terminal device private key of the terminal device to the third-party payment application. Each terminal device can have one corresponding pair of public and private keys. The terminal device private key can be stored in the terminal device, and the terminal device public key can be stored in the offline payment server of the target payment application, so that the offline payment server sends a generated offline payment certificate to the terminal device after encrypting the offline payment certificate by using the terminal device public key. As such, only the terminal device can obtain the offline payment certificate by performing decryption by using the terminal device private key, to improve the security of sending the certificate, so that only a particular device can use the offline payment certificate of the user. The procedure is also described in subsequent implementations.

After obtaining the user ID and the terminal device ID sent by the payment client, the third-party payment application can send an offline payment activation request to the target payment application. The offline payment activation request includes the user ID of the user and the terminal device ID of the terminal device. Referring to FIG. 2A, for example, in steps 205 and 206, the third-party payment application can forward the request by using its application server, and the application server can use the private key to sign the request when forwarding the request.

The private key here can be allocated by the offline payment server of the target payment application to the application server in advance. An offline payment server of ALIPAY and Huawei Pay are used as an example. The offline payment server can allocate a service ID (namely, a service identifier) that corresponds to Huawei Pay, generate a pair of public and private keys that correspond to the service ID, send the private key to an application server of Huawei Pay, and still store the public key in the offline payment server of ALIPAY. When the application server interacts with the offline payment server, for example, sends an offline payment activation request to the offline payment server, the application server can sign the request by using the private key allocated by the offline payment server, and correspondingly, the offline payment server verifies the signature by using the public key. If the signature is verified, it indicates that the request is indeed sent by the application server of Huawei Pay. As such, it is ensured that a source of the request is reliable and legal. Certainly, when forwarding the request in step 206, the application server can add the service ID to the request. As such, in step 207, the offline payment server can identify the corresponding public key based on the service ID and verify the signature. Service IDs allocated by the offline payment server of the target payment application to different third-party payment applications can be different. For example, a service ID of a Huawei Pay application is different from a service ID of a Samsung Pay application.

In steps 208 to 210, the offline payment server of the target payment application allocates the corresponding offline payment certificate to the user. The certificate is equivalent to an ID of the user. For example, in an offline environment without a network, an identity of the user can be confirmed accordingly provided that the offline payment certificate is provided, and money can be deducted from a payment account of the user.

The offline payment server can obtain a corresponding user account based on the user ID token included in the request, learn that a user of which account needs to request to enable offline payment, and generate a corresponding offline payment certificate for the account. An algorithm method for generating the certificate can be set by the target payment application autonomously. Then, to ensure the security, the offline payment server can obtain the corresponding terminal device public key based on the terminal device ID included in the request, encrypt the offline payment certificate by using the terminal device public key, and then send the encrypted offline payment certificate to the third-party payment application. In steps 211 and 212 in FIG. 2B, the application server returns the encrypted offline payment certificate to the third-party payment application on a terminal device side. The third-party payment application can perform decryption by using the terminal device private key, to obtain the offline payment certificate.

After obtaining the offline payment certificate, the third-party payment application further needs to store the offline payment certificate in the terminal device where the third-party payment application is located, that is, store the offline payment certificate as in FIGS. 2A-2B. As shown in FIGS. 2A-2B, the third-party payment application can store the offline payment certificate in the local storage device of the terminal device, and further cooperate with the local storage device to perform encrypted storage on the certificate. For example, the third-party payment application can send a certificate storage request to the local authentication center in the local storage device. The request includes the offline payment certificate issued by the offline payment server of the target payment application to the user and received by the third-party payment application. In addition, the local authentication center can prompt the user to select an identity authentication method, for example, fingerprint authentication, iris authentication, or another method. After the user selects an authentication method, the third-party payment application can transmit an identity authentication identifier of the user to the local authentication center. The identity authentication identifier is, for example, a fingerprint of the user or an iris of the user.

The local authentication center can instruct the local security storage to generate a corresponding associated key based on the identity authentication identifier of the user, and to perform encrypted storage on the offline payment certificate of the user by using the associated key. As such, when the user subsequently needs to make offline payment by using the stored offline payment certificate, the identity authentication identifier of the user needs to be provided, and the certificate can be provided only after the identity authentication identifier is verified, where details are described in a subsequent offline payment use procedure. As such, the use of the certificate can be more secure, and it can be ensured that the offline payment certificate is used by the user in person this time.

Finally, in steps 224 to 226, the third-party payment application can notify the offline payment server of the target payment application that the offline payment certificate has been stored in the terminal device locally. In this case, the offline payment server can record the offline payment activation information. For example, the information can include the user ID (the ID here can be the user account), the offline payment certificate that corresponds to the account, and can further include information such as an offline payment activation time.

By using the previous procedure shown in FIGS. 2A-2B, the third-party payment application requests the target payment application to enable offline payment of a user, obtains an offline payment certificate of the user that is returned by the target payment application, and stores the certificate in the terminal device where the third-party payment application is located. In addition, encrypted storage is performed on the certificate in the terminal device by using an associated key that corresponds to an identity authentication identifier of the user. Next, a process performed by the third-party payment application when the user needs to use the offline payment of the target payment application is described.

Offline Payment Use:

The use procedure is still described by using the application scenario shown in FIGS. 2A-2B as an example. A third-party payment application stores an offline payment certificate in a terminal device locally, and performs encrypted storage. When a user needs to make offline payment after purchasing a merchandise, the user can quickly open the third-party payment application in the consumer terminal device, select a target payment application from the third-party payment application, and determine to use the target payment application to make offline payment. After the third-party payment application receives the user selection, in other words, receives an offline payment request that corresponds to the target payment application and is initiated by the user, the use procedure shown in FIG. 3 can be performed, that is, an offline payment procedure can be performed.

Figure 3:
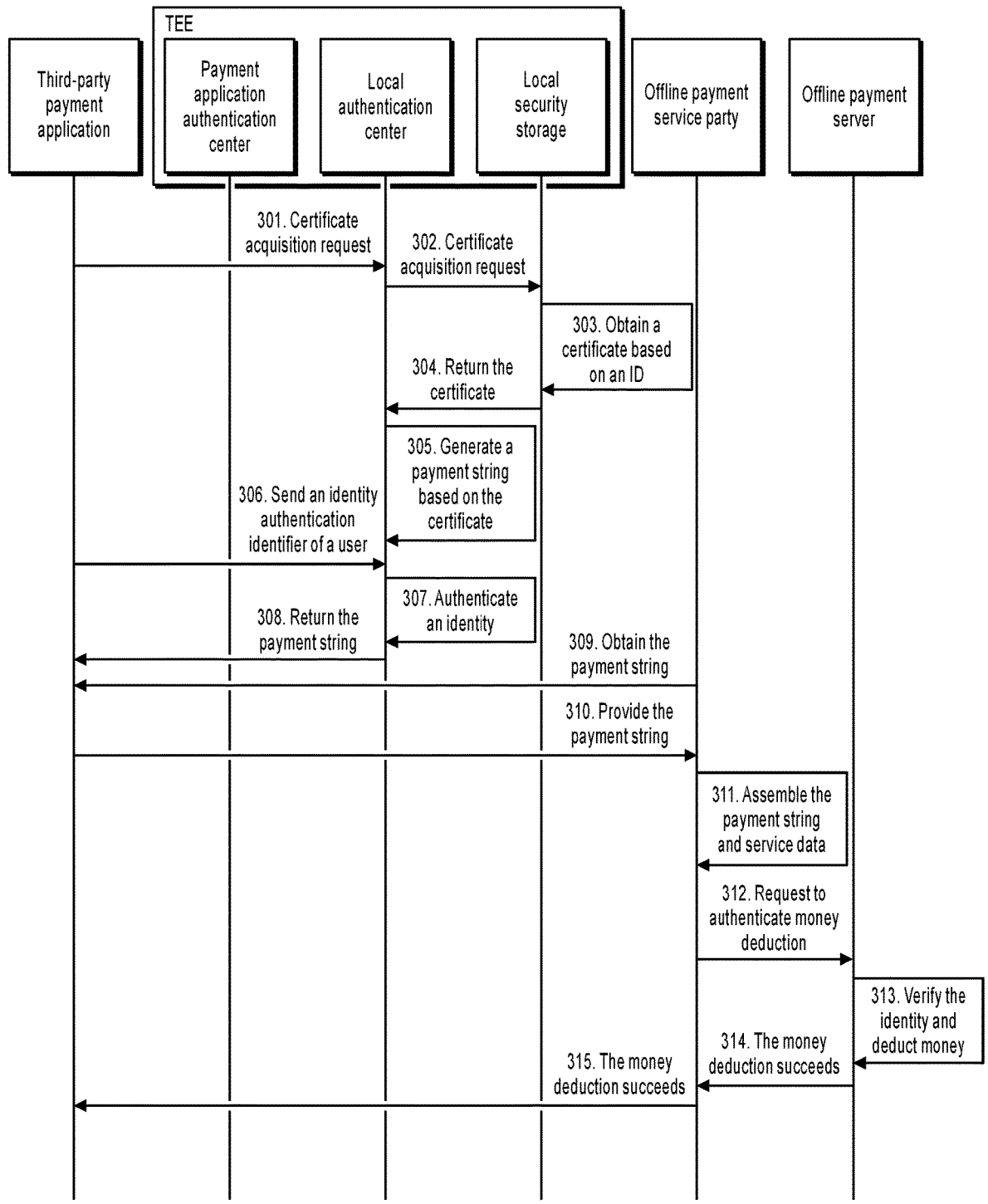
FIG. 3 illustrates an offline payment use procedure, according to an example implementation of the present application.

As shown in FIG. 3, the third-party payment application can send a certificate acquisition request to a local storage device to request to obtain an offline payment certificate of the user. In addition, when the user chooses to use the offline payment of the target payment application in the third-party payment application, the user can be instructed to provide an account ID registered by the user in the target payment application, and add the account ID to the certificate acquisition request, so that local security storage can learn that the third-party payment application needs to obtain an offline payment certificate of which user.

When storing the offline payment certificate, a payment client can store the offline payment certificate based on a mapping relationship that "an account ID corresponds to an offline payment certificate". Then, in step 303, the corresponding offline payment certificate can be identified based on the account ID of the user who currently requests offline payment, and the certificate can be sent to a local authentication center. The local authentication center can generate a corresponding payment string based on the offline payment certificate, where the payment string can be a payment string (or can be a key string) generated by using the offline payment certificate as a factor and based on a certain algorithm rule; and return the payment string to the local authentication center. In addition, a storage method is not limited to the previous method in detailed implementation, and the offline payment certificate can be stored in another method. For example, a mapping relationship between a payment application and a certificate can be stored. As such, a corresponding certificate can be determined based on an application that the user selects to use for offline payment.

In step 306 to step 308, the local authentication center can first authenticate the user before returning the payment string to the third-party payment application. If an authentication method selected by the user is fingerprint authentication in the activation procedure shown in FIG. 2, in step 306, the third-party payment application can obtain fingerprint information of the user, and transmit the fingerprint information to the local authentication center. The local authentication center can provide the payment string for the third-party payment application when determining that the obtained identity authentication identifier is verified based on an identity authentication identifier stored at the time the user enables the offline payment of the target payment application. The local authentication center feeds back the offline payment certificate of the user to the third-party payment application itself. But for better security, it generates the corresponding payment string by using the offline payment certificate based on a certain rule. Subsequently, an offline payment server can convert the payment string into the offline payment certificate to learn of a user's identity, and the offline payment server knows the generation rule used when the local authentication center generates the payment string.

By using steps 301 to 308, the third-party payment application obtains the offline payment certificate of the user, and obtains the certificate when the identity authentication identifier of the user is verified, so that it can be ensured that the user obtains the offline payment certificate of the user, to further improve the offline payment security. In steps 309 and 310, the third-party payment application can provide the payment string for an offline payment service party. The offline payment service party can be a payment collection system of a merchant. A method that the payment collection system obtains the payment string can be flexibly set to a plurality of methods, for example, a two-dimensional code, NFC, Bluetooth, and a sound wave. For example, when the payment string is presented in a form of a two-dimensional code, the payment collection system of the merchant can obtain the payment string through scanning.

In steps 311 to 315, the merchant can use the obtained payment string to request the offline payment server of the target payment application to process the offline payment of the user, and provide the payment string for the offline payment server of the target payment application. After obtaining the payment string, the offline payment server of the target payment application can convert the payment string into the corresponding offline payment certificate based on a predetermined rule, can learn of a user account that corresponds to the certificate based on the generation rule of the certificate, and the certificate user, and then can deduct money from a payment account of the user. The payment collection system can provide the third-party consumer application with feedback that money deduction succeeds.

It can be seen from the previous process that, for example, when the consumer terminal device of the user does not use a network and is in an offline state, if the offline payment of the target payment application needs to be used, the user can open the third-party payment application on the terminal device, and select offline payment of a target payment application from the application. In this case, the third-party payment application can obtain the pre-stored offline payment certificate of the user from the terminal device locally based on the request of the user, and obtain the certificate only after the identity authentication identifier is verified. Then, the third-party payment application can provide the certificate for the merchant, for example, by using a two-dimensional code scanning method. The merchant sends a request to the offline payment server of the target payment application by carrying the certificate, to request to perform offline payment processing for the user that corresponds to the certificate, that is, deduct money from the payment account of the user, to complete local offline payment.

Figure 4:
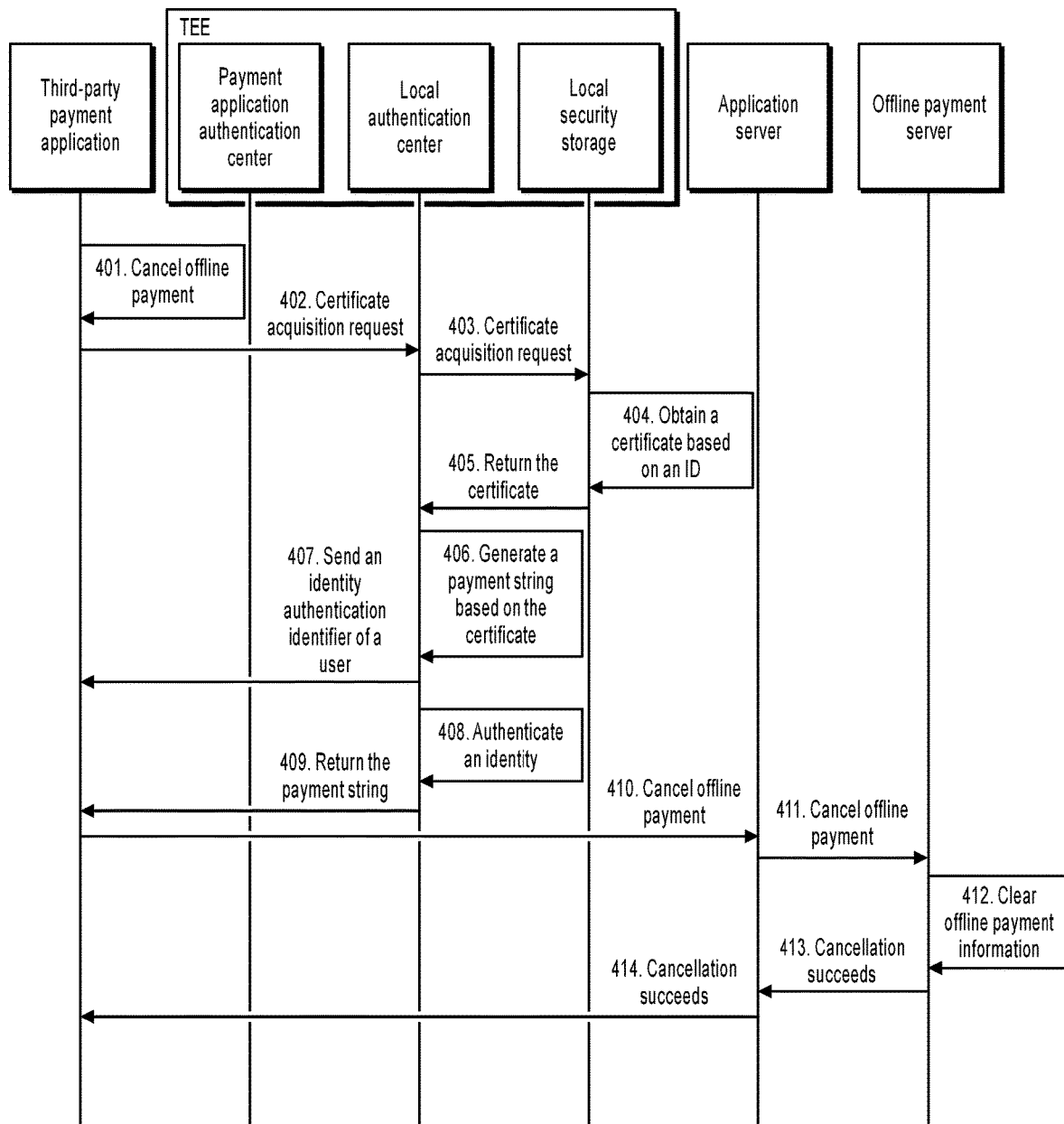
FIG. 4 illustrates an offline payment deactivation procedure, according to an example implementation of the present application.

Offline Payment Deactivation:

A third-party payment application can further interact with a target payment application to cancel offline payment of a user in the target payment application. For an offline payment deactivation procedure, references can be made to FIG. 4. The procedure includes the following: In step 401, the third-party payment application receives an offline payment cancellation request initiated by the user. For example, the user can choose to deactivate offline payment of a target payment application in a page of the third-party payment application. Then, in steps 402 to 409, the third-party payment application obtains a payment string generated by using an offline payment certificate as a factor from a local storage device. For a detailed procedure, references can be made to the description in FIG. 3.

In steps 410 and 411, the third-party payment application can send the offline payment cancellation request (namely, an offline payment deactivation request) to an offline payment server of the target payment application through forwarding of an application server, and add the obtained payment string to the request. Alternatively, the payment string may not be obtained, but a payment client can return the offline payment certificate to the third-party payment application, and the application adds the offline payment certificate to the offline payment cancellation request. Even if the payment string is obtained, the offline payment server can obtain the offline payment certificate based on the payment string.

In step 412, the offline payment server of the target payment application can obtain a user account (namely, a user ID, where both the token mentioned above or the user account can be referred to as a user ID) that corresponds to the offline payment certificate obtained based on the received offline payment cancellation request, to learn of a user who requests to cancel offline payment. In addition, offline payment activation information of the user is deleted. In steps 413 and 414, the offline payment server can feedback an offline payment cancellation success notification to the third-party payment application.

In addition, in the previous example, the third-party payment application stores the offline payment certificate in a terminal device locally after obtaining the offline payment certificate from the offline payment server of the target payment application. When the user uses the offline payment of the target payment application, the third-party payment application can obtain the certificate from the terminal device locally, and then provide the certificate for an offline payment service party, for example, a payment collection system of a merchant. A procedure is not limited to the procedures shown in FIG. 2 to FIG. 4 in actual implementations. For example, in another example, alternatively, the third-party payment application can store the certificate itself after obtaining the certificate from the target payment application, that is, not by using the payment client of the target payment application.

In the offline payment method in the present implementation of the present application, a method that a target payment application provides an offline payment certificate of a registered user of the application for a third-party payment application is provided. The third-party payment application can interact with the target payment application to obtain the certificate provided by the target payment application. In addition, the third-party payment application can store the certificate on the terminal device side. When the user subsequently needs to use the offline payment of the target payment application by using the third-party payment application, the third-party payment application can retrieve the stored certificate, and provide the certificate for the merchant after an identity authentication identifier of the user is verified, so that the merchant requests the target payment application to make offline payment of the corresponding user based on the certificate for money deduction. This is a method that the target payment application outputs an offline payment service of the target payment application to the third-party payment application, so that the user can use the offline payment of the target payment application by using the third-party payment application.

In an example implementation, a non-transitory computer readable storage medium including an instruction is further provided, for example, a memory including an instruction, and the instruction can be executed by a processor of a device to complete the method. For example, the non-transitory computer readable storage medium can be a ROM, a random access memory (RAM), a CD-ROM, a magnetic tape, a floppy disk, and an optical data storage device.

Figure 5:
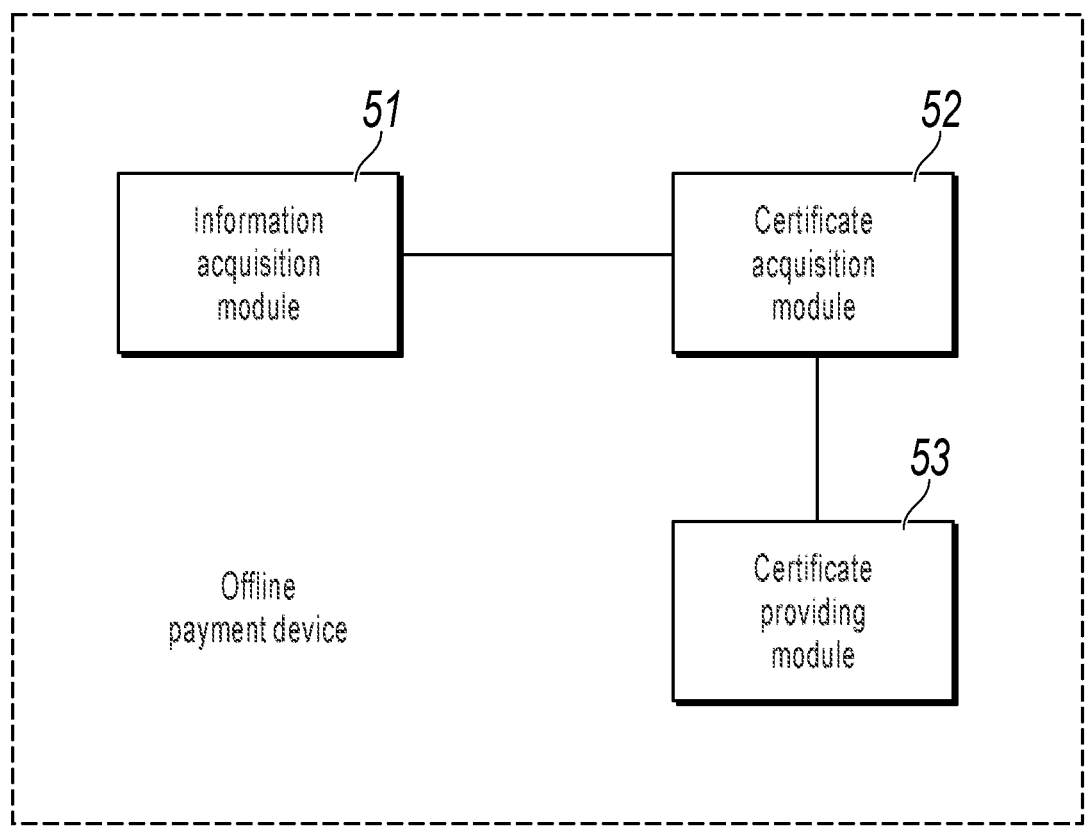
FIG. 5 is a structural diagram illustrating an offline payment device, according to an example implementation of the present application.

To implement the previous method, an implementation of the present application further provides an offline payment device. The device is applied to a third-party payment application, and is configured to make offline payment by using a target payment application in the third-party payment application integrated into a terminal device. As shown in FIG. 5, the device can include an information acquisition module 51, a certificate acquisition module 52, and a certificate providing module 53.

The information acquisition module 51 is configured to obtain an identity authentication identifier of a user that sends an offline payment request when the third-party payment application receives the offline payment request that corresponds to the target payment application, where the user is a registered user of the target payment application.

The certificate acquisition module 52 is configured to obtain an offline payment certificate issued by the target payment application to the user and stored in the terminal device, when it is determined that the obtained identity authentication identifier is verified based on an identity authentication identifier stored at the time the user enables offline payment of the target payment application.

The certificate providing module 53 is configured to provide the offline payment certificate for an offline payment service party, so that the offline payment service party requests the target payment application to process the offline payment of the user based on the offline payment certificate.

Figure 6:
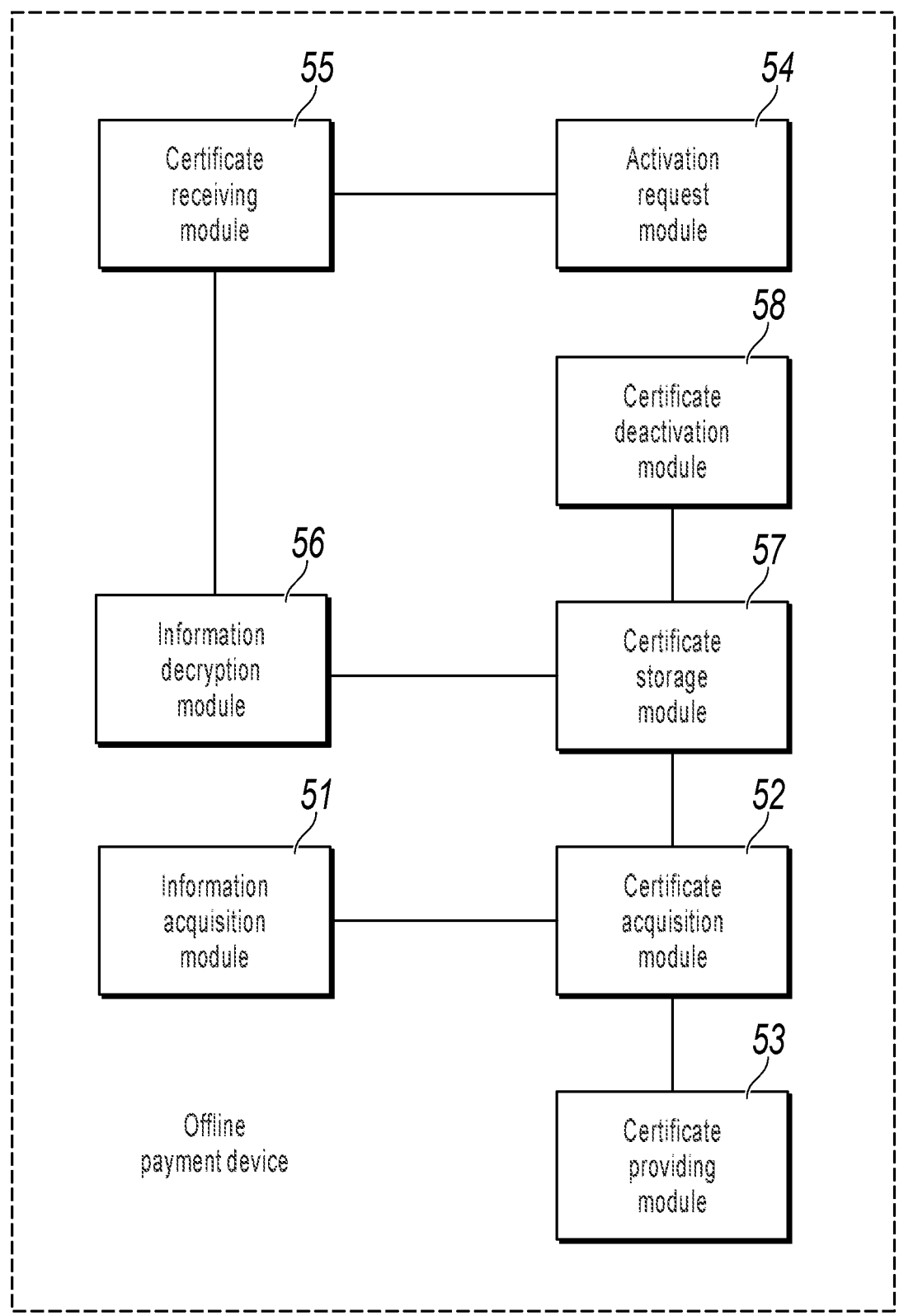
FIG. 6 is a structural diagram illustrating another offline payment device, according to an example implementation of the present application.

In another example, as shown in FIG. 6, the device can further include an activation request module 54, a certificate receiving module 55, a certificate decryption module 56, and a certificate storage module 57.

The activation request module 54 is configured to send an offline payment activation request to the target payment application, where the offline payment activation request includes a user ID of the user and a terminal device ID of the terminal device.

The certificate receiving module 55 is configured to receive the offline payment certificate that corresponds to the user ID and is returned by the target payment application, where the offline payment certificate is encrypted by the target payment application by using a terminal device public key that corresponds to the terminal device ID.

The certificate decryption module 56 is configured to perform, by the third-party payment application, decryption by using a terminal device private key that corresponds to the terminal device ID, to obtain the offline payment certificate.

The certificate storage module 57 is configured to store the offline payment certificate in the terminal device.

The device can further include a certificate deactivation module 58, configured to send an offline payment deactivation request to the target payment application, where the offline payment deactivation request includes the offline payment certificate issued to the user, so that the target payment application can delete the offline payment certificate.

Figure 7:
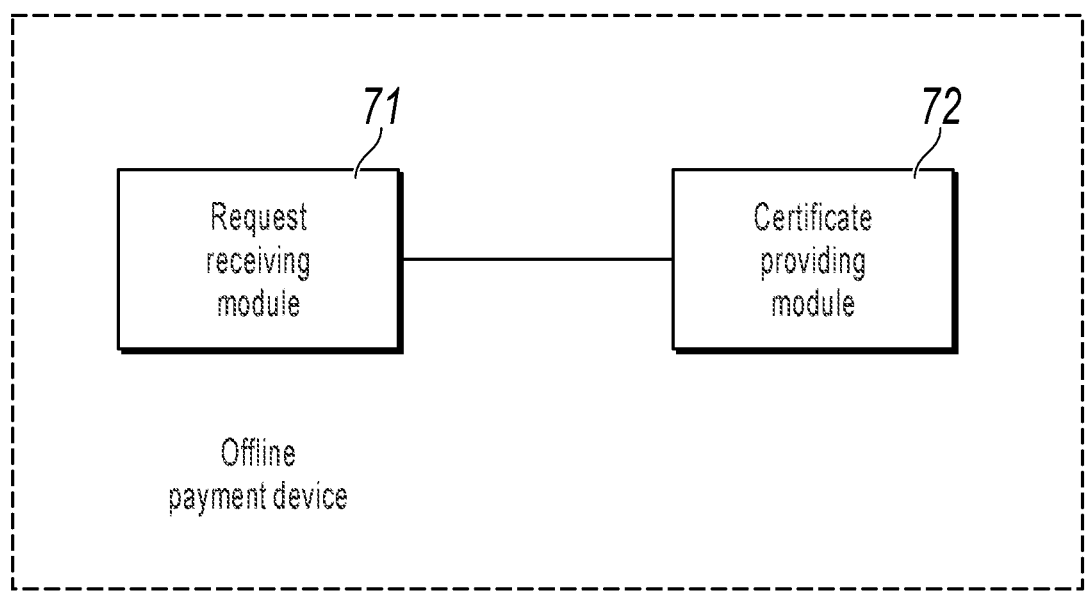
FIG. 7 is a structural diagram illustrating still another offline payment device, according to an example implementation of the present application.

To implement the previous method, an implementation of the present application further provides an offline payment device. The device is applied to an offline payment server of a target payment application, and is configured to make offline payment by using a target payment application in a third-party payment application integrated into a terminal device. As shown in FIG. 7, the device can include a request receiving module 71 and a certificate providing module 72.

The request receiving module 71 is configured to receive an offline payment activation request sent by the third-party payment application, where the offline payment activation request includes a user ID of a user and a terminal device ID of the terminal device, and the user is a registered user of the target payment application.

The certificate providing module 72 is configured to generate an offline payment certificate that corresponds to the user ID, and send the offline payment certificate to the third-party payment application after encrypting the offline payment certificate by using a terminal device public key that corresponds to the terminal device ID, so that the third-party payment application obtains the offline payment certificate after performing decryption by using a terminal device private key that corresponds to the terminal device ID.

Figure 8:
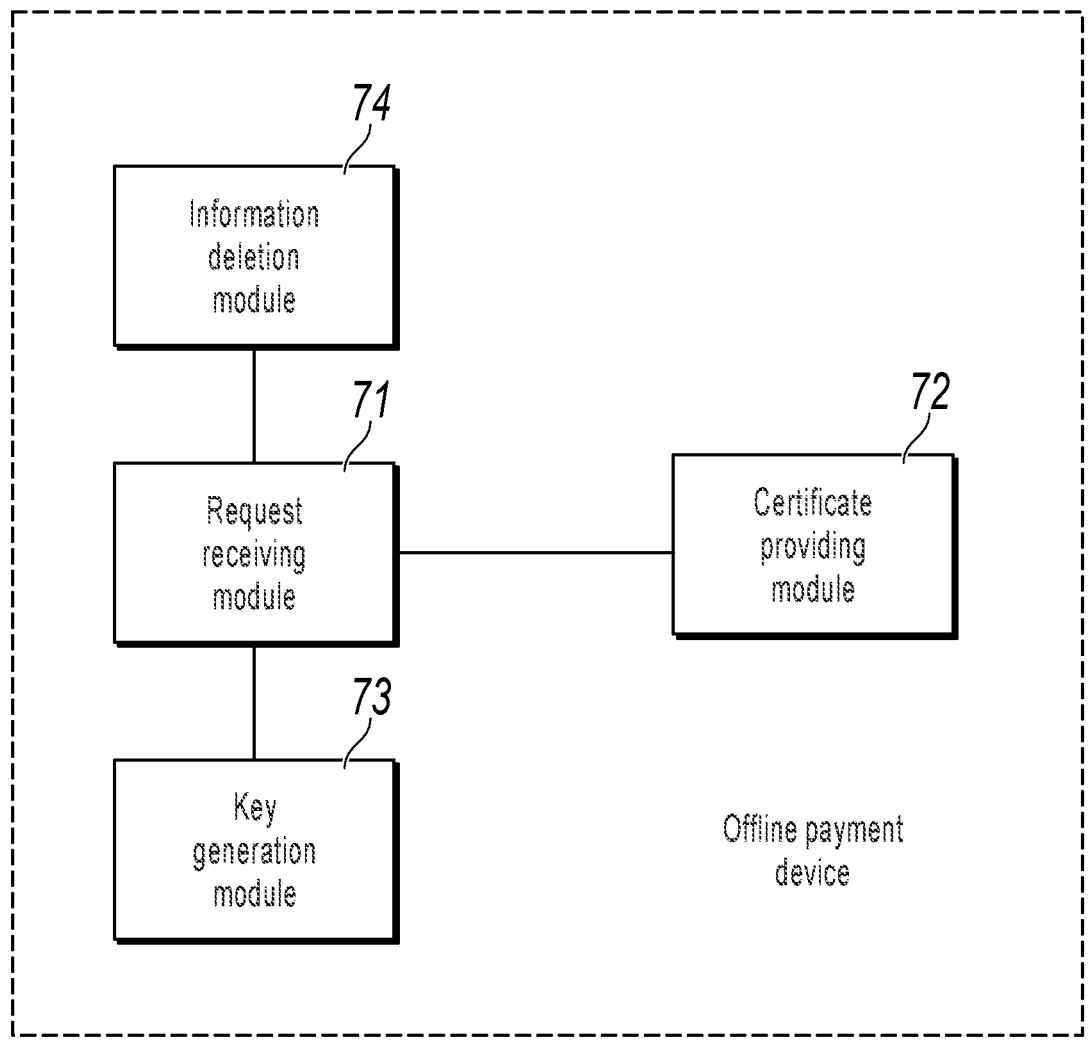
FIG. 8 is a structural diagram illustrating still another offline payment device, according to an example implementation of the present application.

In another example, as shown in FIG. 8, the device can further include a key generation module 73.

The key generation module 73 is configured to generate a corresponding service ID and a pair of public and private keys that correspond to the service ID for the third-party payment application, and send the private key to the third-party payment application.

The request receiving module 71 is further configured to obtain the corresponding public key based on the service ID after receiving the offline payment activation request, and verify, by using the public key, that the offline payment activation request is sent by the third-party payment application. The user ID and the terminal device ID included in the offline payment activation request are signed by the third-party payment application by using the private key, and the request further includes the service ID.

In an example, the device can further include an information deletion module 74.

The request receiving module 71 is further configured to receive an offline payment deactivation request sent by the third-party payment application, where the offline payment deactivation request includes the offline payment certificate.

The information deletion module 74 is configured to obtain the corresponding user ID based on the offline payment certificate, and delete offline payment activation information of the user ID.

The previous descriptions are merely example implementations of the present application, but are not intended to limit the present application. Any modification, equivalent replacement, or improvement made without departing from the spirit and principle of the present application shall fall within the protection scope of the present application.

Figure 9:
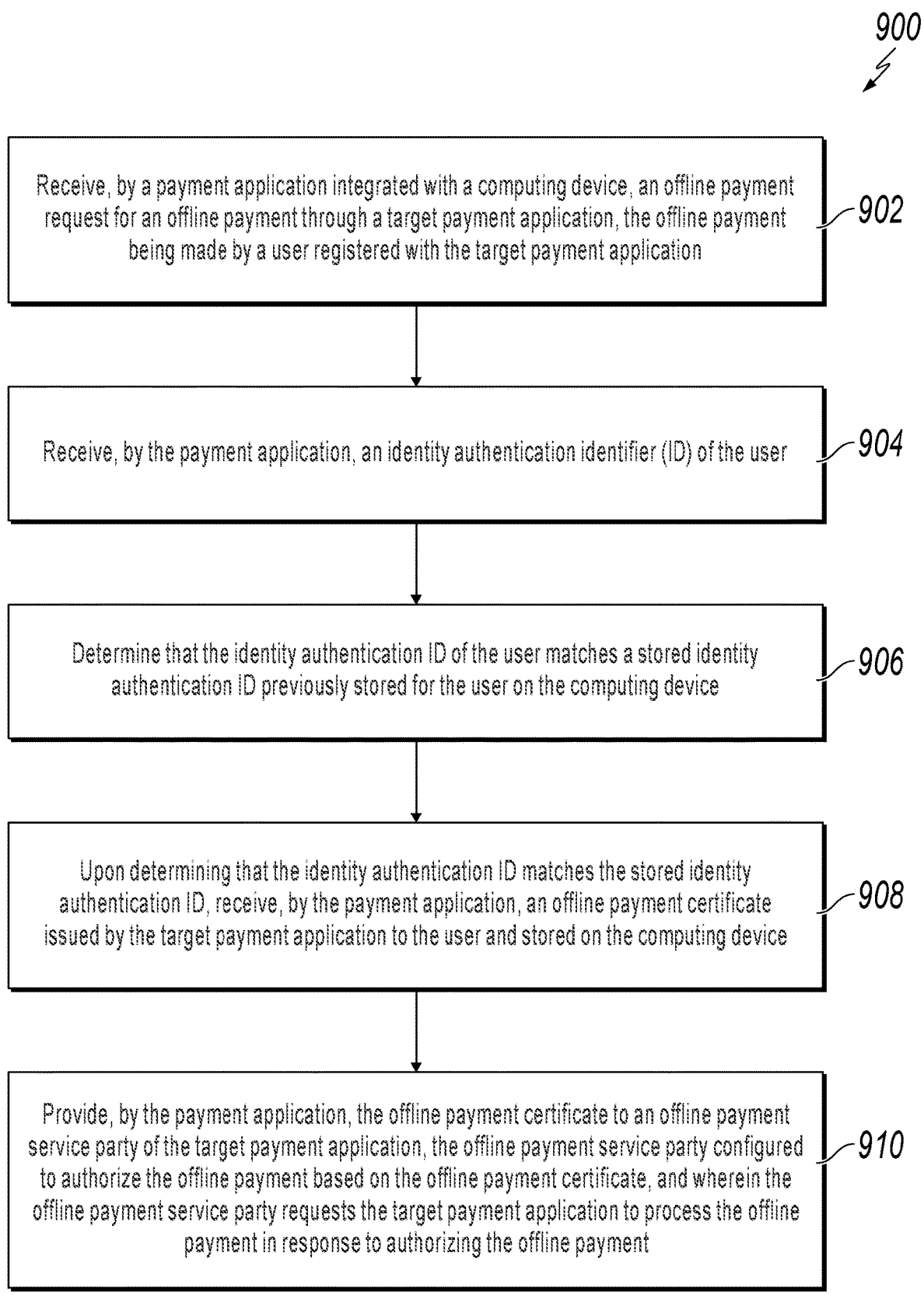
FIG. 9 is a flowchart illustrating an example of a computer-implemented method for creating an offline payment certificate for a payment to an offline payment service party, according to an implementation of the present disclosure.

FIG. 9 is a flowchart illustrating an example of a computer-implemented method 900 for creating an offline payment certificate for a payment to an offline payment service party, according to an implementation of the present disclosure. For clarity of presentation, the description that follows generally describes method 900 in the context of the other figures in this description. However, it will be understood that method 900 can be performed, for example, by any system, environment, software, and hardware, or a combination of systems, environments, software, and hardware, as appropriate. In some implementations, various steps of method 900 can be run in parallel, in combination, in loops, or in any order.

At 902, an offline payment request for an offline payment is received by a payment application integrated with a computing device. The offline payment request is received through a target payment application. The offline payment is made by a user registered with the target payment application. As an example, the third-party payment application 12, executing on the consumer terminal device 11, can receive an offline payment request for a purchase made by the user of the consumer terminal device 11. From 902, method 900 proceeds to 904.

At 904, an identity authentication identifier (ID) of the user is received by the payment application. For example, the third-party payment application 12 can receive the identity authentication of the user. The identity authentication ID can be, for example, a fingerprint authentication, an iris authentication, or a different type of biometric authentication. From 904, method 900 proceeds to 906.

At 906, a determination is made that the identity authentication ID of the user matches a stored identity authentication ID previously stored for the user on the computing device. As an example, referring to step 307 of FIG. 3, the local authentication center of the TEE can compare the identity authentication ID of the user to information stored in local security storage. From 906, method 900 proceeds to 908.

At 908, upon determining that the identity authentication ID matches the stored identity authentication ID, an offline payment certificate issued by the target payment application to the user and stored on the computing device is received by the payment application. As an example, the certificate acquisition module 52 can obtain an offline payment certificate issued by the target payment application to the user and stored in the terminal device. The offline payment certificate can be a two-dimensional code, for example. From 908, method 900 proceeds to 910.

At 910, the offline payment certificate is provided by the payment application to an offline payment service party of the target payment application. The offline payment service party can authorize the offline payment based on the offline payment certificate. The offline payment service party can request the target payment application to process the offline payment in response to authorizing the offline payment. After 910, method 900 stops.

In some implementations, method 900 further includes steps for activation of offline payments, for example, as part of a registration process. As an example, before receiving the offline payment request, the payment application can send an offline payment activation request to the target payment application. The offline payment activation request can include a user ID of the user and a computing device ID of the computing device. The offline payment certificate that corresponds to the user can be received by the payment application, for example, by the third-party payment application 12. The offline payment certificate can be encrypted, for example, by a payment client of the target payment application 13. Encryption can occur by using a computing device public key that corresponds to the computing device ID. The payment application can decrypt the offline payment certificate by using a computing device private key that corresponds to the computing device ID. The offline payment certificate can be stored on the computing device by the payment application.

In some implementations, storing the offline payment certificate on the computing device can include sending, by the payment application, the identity authentication ID of the user to a local storage device on the computing device for generation. An associated key corresponding to the identity authentication ID can be generated by the local storage device. The associated key can be used for encrypting the offline payment certificate prior to storage. Further, receiving the offline payment certificate can include using the associated key to decrypt the offline payment certificate, for example, using decryption/encryption capabilities of the TEE 14.

In some implementations, method 900 can further include sending, by the payment application, an offline payment deactivation request to the target payment application for use by the target payment application to delete the offline payment certificate. For example, when the user is no longer to be registered with the offline payment server of the target payment application, a deactivation request can be sent by the consumer terminal device 11 to the offline payment server 16 of the target application.

In some implementations, method 900 can further include steps for using a service ID in association with the offline payment activation request. For example, before sending the offline payment activation request, the offline payment server can send a service ID for the payment application and a pair of public and private keys corresponding to the service ID. The service ID and the pair of public and private keys corresponding to the service ID can be received by the payment application, for example, at the payment client 13.

The offline payment activation request can be signed by the payment application using the private key. The service ID can be included in the offline payment activation request. The signed offline payment activation request and the service ID can be used by the offline payment server to verify the offline payment activation request.

Techniques described in the present disclosure can allow the user to easily obtain an offline payment identity certificate of a payment application from a third-party payment application. As such, a payment made by the user can be more convenient because the third-party payment application can be integrated into the user's computing device (for example, a smart phone) in order to complete the offline payment. The stored certificate can be obtained locally from the user's computing device after verifying an identity authentication ID of the user, leading to a secure use of the certificate. The security can be enhanced by using a trusted execution environment (TEE) on the user's computing device. The TEE can provide services such as authorization, authentication, and storage.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   sending, by a third-party payment application of a computing device comprising one or more processing devices, a payment activation request to a target payment application, wherein the payment activation request comprises a user identifier (ID) of a user of the target payment application, wherein the third-party payment application and the target payment application are associated with two different payment platforms;
   receiving, by the one or more processing devices and from the target payment application, a barcode associated with the user ID;
   storing, by the one or more processing devices, the barcode and a first identity authentication ID of the user in a trusted execution environment (TEE) of the computing device, wherein the third-party payment application is external to the TEE;
   receiving, by the one or more processing devices, a payment request for a payment corresponding to the target payment application;
   receiving, by the one or more processing devices, a second identity authentication ID of the user;
   determining, by the one or more processing devices, that the second identity authentication ID of the user matches the first identity authentication ID;
   in response to determining that the second identity authentication ID matches the first identity authentication ID, retrieving, by the one or more processing devices, the barcode;
   displaying, by the one or more processing devices, the barcode for scanning by a payment service party associated with the target payment application; and
   receiving, by the one or more processing devices, a notification that the payment is successful.

2. The computer-implemented method of claim 1, wherein the payment activation request further comprises a computing device ID of the computing device, wherein the computer-implemented method further comprises:
   generating an additional barcode by encrypting the barcode using a computing device public key corresponding to the computing device ID;
   receiving, by the third-party payment application, the additional barcode; and
   obtaining the barcode, by the third-party payment application and by using a computing device private key that corresponds to the computing device ID, by decrypting the additional barcode.

3. The computer-implemented method of claim 2:
   wherein storing the barcode on the computing device includes:
      generating, by the one or more processing devices, an associated key corresponding to the first identity authentication ID, and
      encrypting the barcode by using the associated key,
   wherein retrieving, by the one or more processing devices, the barcode comprises decrypting the barcode by using the associated key.

4. The computer-implemented method of claim 1, wherein the method further comprises:
   sending, by the third-party payment application, a payment deactivation request to the target payment application; and
   deleting, by the target payment application, the barcode.

5. The computer-implemented method of claim 2, further comprising:
   receiving, by the third-party payment application and from the target payment application before sending the payment activation request, a service ID for the third-party payment application and a private key corresponding to the service ID;
   generating, by the third-party payment application, a digital signature by signing the payment activation request using the private key;
   including, by the third-party payment application, the service ID in the payment activation request;
   obtaining, by the target payment application and based on the service ID, a public key corresponding to the service ID;
   verifying, by the target payment application the digital signature using the public key;
   in response to verifying the digital signature, obtaining, by the target payment application, a user account corresponding to the user ID; and
   generating, by the target payment application and based on the user account, the barcode.

6. The computer-implemented method of claim 2, wherein the barcode is a two-dimensional code.

7. The computer-implemented method of claim 1, wherein the first identity authentication ID is a fingerprint authentication or an iris authentication.

8. A non-transitory computer-readable storage medium coupled to a computing device comprising one or more processing devices and storing instructions that when executed by the computing device, cause the computing device to perform operations comprising:

sending, by a third-party payment application of the computing device, a payment activation request to a target payment application, wherein the payment activation request comprises a user identifier (ID) of a user of the target payment application, wherein the third-party payment application and the target payment application are associated with two different payment platforms;

receiving, by the one or more processing devices and from the target payment application, a barcode associated with the user ID;

storing, by the one or more processing devices, the barcode and a first identity authentication ID of the user in a trusted execution environment (TEE) of the computing device, wherein the third-party payment application is external to the TEE;

receiving, by the one or more processing devices, a payment request for a payment corresponding to the target payment application;

receiving, by the one or more processing devices, a second identity authentication ID of the user;

determining, by the one or more processing devices, that the second identity authentication ID of the user matches the first identity authentication ID;

in response to determining that the second identity authentication ID matches the first identity authentication ID, retrieving, by the one or more processing devices, the barcode;

displaying, by the one or more processing devices, the barcode for scanning by a payment service party associated with the target payment application; and receiving, by the one or more processing devices, a notification that the payment is successful.

9. The non-transitory computer-readable storage medium of claim 8, wherein the payment activation request further comprises a computing device ID of the computing device, wherein the operations further comprise:

generating an additional barcode by encrypting the barcode using a computing device public key corresponding to the computing device ID;

receiving, by the third-party payment application, the additional barcode; and obtaining the barcode, by the third-party payment application and by using a computing device private key that corresponds to the computing device ID, by decrypting the additional barcode.

10. The non-transitory computer-readable storage medium of claim 9:

wherein storing the barcode on the computing device includes:
generating, by the one or more processing devices, an associated key corresponding to the first identity authentication ID, and
encrypting the barcode by using the associated key,
wherein retrieving, by the one or more processing devices, the barcode comprises decrypting the barcode by using the associated key.

11. The non-transitory computer-readable storage medium of claim 8, wherein the operations further comprise:

sending, by the third-party payment application, a payment deactivation request to the target payment application; and deleting, by the target payment application, the barcode.

12. The non-transitory computer-readable storage medium of claim 9, wherein the operations further comprise:

receiving, by the third-party payment application and from the target payment application before sending the payment activation request, a service ID for the third-party payment application and a private key corresponding to the service ID;

generating, by the third-party payment application, a digital signature by signing the payment activation request using the private key;

including, by the third-party payment application, the service ID in the payment activation request;

obtaining, by the target payment application and based on the service ID, a public key corresponding to the service ID;

verifying, by the target payment application the digital signature using the public key;

in response to verifying the digital signature, obtaining, by the target payment application, a user account corresponding to the user ID; and generating, by the target payment application and based on the user account, the barcode.

13. The non-transitory computer-readable storage medium of claim 9, wherein the barcode is a two-dimensional code.

14. The non-transitory computer-readable storage medium of claim 8, wherein the first identity authentication ID is a fingerprint authentication or an iris authentication.

15. A system, comprising:
a computing device comprising one or more processing devices; and
one or more computer-readable memories coupled to the computing device and storing instructions that when executed by the computing device, cause the computing device to perform operations comprising:

sending, by a third-party payment application of the computing device, a payment activation request to a target payment application, wherein the payment activation request comprises a user identifier (ID) of a user of the target payment application, wherein the third-party payment application and the target payment application are associated with two different payment platforms;

receiving, by the one or more processing devices and from the target payment application, a barcode associated with the user ID;

storing, by the one or more processing devices, the barcode and a first identity authentication ID of the user in a trusted execution environment (TEE) of the computing device, wherein the third-party payment application is external to the TEE;

receiving, by the one or more processing devices, a payment request for a payment corresponding to the target payment application;

receiving, by the one or more processing devices, a second identity authentication ID of the user;

determining, by the one or more processing devices, that the second identity authentication ID of the user matches the first identity authentication ID;

in response to determining that the second identity authentication ID matches the first identity authentication ID, retrieving, by the one or more processing devices, the barcode;

displaying, by the one or more processing devices, the barcode for scanning by a payment service party associated with the target payment application; and receiving, by the one or more processing devices, a notification that the payment is successful.

16. The system of claim 15, wherein the payment activation request further comprises a computing device ID of the computing device, wherein the operations further comprise:
- generating an additional barcode by encrypting the barcode using a computing device public key corresponding to the computing device ID;
- receiving, by the third-party payment application, the additional barcode; and
- obtaining the barcode, by the third-party payment application and by using a computing device private key that corresponds to the computing device ID, by decrypting the additional barcode.

17. The system of claim 16:
wherein storing the barcode on the computing device includes:
- generating, by the one or more processing devices, an associated key corresponding to the first identity authentication ID, and
- encrypting the barcode by using the associated key, wherein retrieving, by the one or more processing devices, the barcode comprises decrypting the barcode by using the associated key.

18. The system of claim 15, wherein the operations further comprise:
- sending, by the third-party payment application, a payment deactivation request to the target payment application; and
- deleting, by the target payment application, the barcode.

19. The system of claim 16, wherein the operations further comprise:
- receiving, by the third-party payment application and from the target payment application before sending the payment activation request, a service ID for the third-party payment application and a private key corresponding to the service ID;
- generating, by the third-party payment application, a digital signature by signing the payment activation request using the private key;
- including, by the third-party payment application, the service ID in the payment activation request;
- obtaining, by the target payment application and based on the service ID, a public key corresponding to the service ID;
- verifying, by the target payment application the digital signature using the public key;
- in response to verifying the digital signature, obtaining, by the target payment application, a user account corresponding to the user ID; and
- generating, by the target payment application and based on the user account, the barcode.

20. The system of claim 16, wherein the barcode is a two-dimensional code.

* * * * *